United States Patent Office 3,470,143
Patented Sept. 30, 1969

3,470,143
HIGHLY FLUORINATED HYDROCARBONS USED AS DILUENTS IN THE POLYMERIZATION OF ETHYLENICALLY UNSATURATED MONOMERS
Albert Schrage, East Orange, and Jules E. Schoenberg, Bergenfield, N.J., assignors to Dart Industries Inc., Los Angeles, Calif., a corporation of Delaware
No Drawing. Filed Mar. 26, 1964, Ser. No. 355,091
Int. Cl. C08f 1/08, 45/30
U.S. Cl. 260—82.5                    8 Claims

ABSTRACT OF THE DISCLOSURE

In a process for the preparation of a boiling-xylene soluble polymer in a slurry which comprises polymerizing at least one ethylenically unsaturated hydrocarbon monomer to an amorphous elastomer in a reaction zone in a polymerization medium under the influence of a catalyst, an improvement has been found for substantially eliminating reaction zone fouling and recovering the polymer in discrete particle form which comprises employing as a polymerization medium a fluorinated organic carbon compound wherein the ratios of fluorine to other substituents on the carbon compound are in the order of $F/Cl=1.0$ and above, $F/Br=3.0$ and above, $F/H=2.0$ and above, $F/(Cl+H)=2.0$ and above and $F/(Br+H)=3.0$ and above, said amorphous elastomer being substantially insoluble and not swellable in said polymerization medium.

---

This invention relates to an innovation in slurry or particle form polymerization reactions involving ethylenically unsaturated monomers under the influence of a catalyst and to the resulting polymers therefrom.

Polymerization reactions wherein ethylenically unsaturated monomers are polymerized to amorphous or crystalline containing polymers or copolymers have encompassed a wide variety of techniques, processing conditions, catalysts, diluent media, pressures and temperatures. Generally, specific polymerization conditions have heretofore been adapted for the various types of ethylenically unsaturated monomers polymerized such as low temperatures and Friedel-Crafts type catalysts for isoolefins, nominal atmospheric pressure and Ziegler-type catalysts for alpha-olefins and copolymers, free-radical initiators and emulsion polymerization conditions for SBR's and nitrile rubbers, etc. As each process is adapted and refined for a particular monomer(s) polymerization process, limitations are incorporated so that maximum polymer production consonant with economy and equality results from many years of research and development effort in each case. Since some limitations are inherent in almost every process, it is the goal of those skilled in such technical fields to resolve such limitations and apply new techniques to old and known processes, so that polymerization reactions can be performed more efficiently and economically.

Exemplary of but one of the limitations referred to above is conversion factor or total percent solids in solution type polymerizations involving certain ethylenically unsaturated monomers. Thus, in polymerization reactions where stereospecific elastomers such as polybutadiene or polyisoprene are prepared, specifically those where a hydrocarbon solvent is employed as the reaction medium, it is not uncommon to limit conversion of the monomers to a low total percent solids or conversion, that is, in the order of from 5 to 10 percent in order to be able to handle viscous solutions that result from such polymerizations and to prevent reactor fouling.

Generally, amorphous elastomers, stereospecific synthetic rubbers and certain copolymers containing some crystallinity are all prepared in solution at low conversions as indicated above and usually elevated temperatures are required in such processes in order to keep the polymer in solution. Such polymers as indicated above swell or dissolve in hot hydrocarbons so that ordinary particle form or slurry type polymerization reactions are not feasible for such polymer preparations. Thus, even in block copolymerization reactions where a rubbery ethylene-propylene random copolymer block is attached to a heptane-insoluble isotactic polypropylene prepolymer, there is a tendency for the resulting block copolymer to be gummy or sticky thereby adhering to processing vessels, etc. Similarly, even stereospecific homopolymerizations of low melting point highly crystalline polymers such as polybutene, polypentene, polyoctene, etc. are usually carried out at elevated temperatures in hydrocarbon diluents and thereby low conversion, so that the formed polymers will dissolve in the hydrocarbon diluent. In other polymerization reactions, for example, ethylene or propylene, normally liquid inert hydrocarbons are used as the polymerization media and these are not readily separated from the polymer slurry by a simple flashing operation. Moreover, soluble portions of such polymers usually increase the viscosity of the mixture making agitation difficult and separation by filtration or otherwise complicated and costly.

In emulsion polymerizations involving styrene-butadiene elastomers and free-radical catalysts, many steps are required in the process including coagulation of solids, washing to remove electrolytes, drying of latices, etc. Other elastomer producing emulsion polymerization processes such as those for nitrile rubber, etc. Likewise incorporate special process steps which are necessary during one or more stages of the formation of gummy or sticky copolymer masses. It would obviously be highly desirable if a process were provided wherein the foregoing polymers could be prepared in a manner where the polymers were formed as discrete particles or crumbs which could be easily separated from a slurry such as by flashing or filtration and thereafter processed according to known techniques.

An object of this invention is to provide a process for polymerizing ethylenically unsaturated monomers in a slurry wherein the polymer formed is obtained in discrete particle form.

A specific object of this invention is the provision of a process for polymerizing ethylenically unsaturated monomers to elastomeric polymers, said process being capable of being carried out in a slurry type operation and resulting in discrete particle form elastomer materials, such as crumbs or small irregular shaped material.

Another object of the invention is the provision of a process for the polymerization of alpha-olefin polymers of a high crystalline content, but of low melting point.

A still further object of the invention is the provision of a polymerization medium for carrying out a slurry type polymerization process for the polymerization of ethylenically unsaturated monomers.

The foregoing objects of the invention are accomplished by the provision of a process for preparing a polymer which comprises polymerizing at least one ethylenically unsaturated monomer in a polymerization medium under the influence of a catalyst, said medium comprising an organic fluorinated carbon compound wherein the total number of fluorine atoms in the carbon compound at least equals, but preferably exceeds the total number of other substituents present on the carbon compound. The invention is applicable to ethylenically unsaturated monomers which result in polymers, copolymers or interpolymers which are soluble in boiling xylene.

The process of this invention, as will be described in detail henceforth relates generally to the discovery that fluorinated organic carbon compounds as defined are excellent polymerization media for ethylenically unsaturated compounds such as hydrocarbons containing vinylidene, vinyl or vinylene groups, especially those compounds which are useful in the preparation of elastomeric compositions such as ethylene-propylene rubbers (EP rubber), ethylene-propylene non-conjugated diene terpolymers (EPT) and stereospecific synthetic rubber substitutes such as polyisoprene, polybutadiene and the like. As noted hereinbefore, in the polymerization of monomers leading to these elastomeric products, the prior art was limited to low conversions which usually ranged from 5 to 10% total solids in solution. These low conversions were necessary due to the viscous nature of the polymer solutions formed in the normally liquid hydrocarbons used as polymerization diluents. The rubbery polymer formed in hydrocarbons would swell or partially dissolve (or totally in solution processes) in the diluent and due to the gummy and viscous nature of the polymer solution formed would require large volumes of diluent to be present in order to handle the reaction mixture efficiently. Chlorinated hydrocarbons, while heretofore described as suitable for carrying out a polymerization reaction involving elastomeric forming compounds, do nevertheless result in solutions which are viscous and thus the improvements in this respect over straight chain hydrocarbon diluents were not as pronounced. Where chlorinated hydrocarbons have been used as diluents, for example, in butyl rubber manufacture, extremely low temperatures such as −150° F. have been employed to process the polymer efficiently. As will be illustrated, the process of this invention provides a polymerization medium which not only overcomes all these prior art conversion limitations, but also results in elastomeric products which can be prepared substantially dry in discrete particle form by a simple flashing operation or by filtration after the polymerization reaction. By discrete particle form is meant that the polymer formed is not soluble or swellable to any significant extent in the polymerization media and therefore depending on agitation, etc. can be formed as small particle of irregular shapes or beads.

The fluorinated carbon-containing organic compounds which can be used in accordance with the process of this invention comprise acyclic, alicyclic and aromatic types. The preferred compounds are the acyclic and alicyclic compounds and many of these products are available commercially, while others can be manufactured according to information published in the literature. The cyclic and acyclic fluorinated compounds can contain from 1 to 18 carbon atoms and can further contain substituents in the carbon atoms other than fluorine. The choice of fluorinated carbon containing compounds for use as polymerization diluents will be dictated by the nature of the polymer to be formed. In general, however, since the process of this invention is particularly adaptable to the preparation of amorphous polymers a preferred class of fluorinated compounds will be indicated below. Polymers from such as ethylene-propylene copolymers and terpolymers and stereo-specific homopolymers such as polyisoprene and polybutadiene of high and low cis-1,4 contents, as well as those of other configurations are particularly adaptable for preparations according to the process herein.

As indicated above, within the broad scope of this invention, there are preferred types of fluorinated compounds for use as polymerization diluents for amorphous polymers. This preference is based on the solubility of the polymers in the fluorinated carbon compounds which, in general, increases in the order based on the substituents in the carbon atom: $F<Cl<Br<H$. Thus, a fully fluorinated hydrocarbon is the worst solvent. A fully fluorinated carbon compound, for example, cyclic $$C_4F_8 (\overline{CF_2-CF_2-CF_2-CF_2})$$

does not swell elastomers such as ethylene-propylene rubbers, natural rubber, butyl rubber, butadiene-styrene, butadiene-acrylonitrile, Neoprene, etc. A fully fluorinated carbon compound such as $CF_4$ behaves similarly. However, when two chlorine atoms in this latter compound are substituted for fluorine ($CCl_2F_2$), then there is some slight swelling of elastomeric polymers. When a hydrogen and chlorine atom are substituted for two fluorine atoms ($CHClF_2$), then swelling of the polymer is somewhat more pronounced, specifically for some types of elastomeric polymers. The solubility of these polymers increases considerably in compounds such as $CHCl_2F$, $CCl_3F$, etc. and the swelling is substantially comparable to other compounds which do not contain fluorine atoms, for example $CH_3Cl$ and $CH_2Cl_2$. With chlorine as a substituent for fluorine on the carbon atom, therefore, the ratio for the fluorinated compounds, that is the F/Cl ratio per carbon compound should be at least 1.0 and above. With bromine as a substituent for fluorine, the F/Br ratio per carbon compound should be no lower than 3.0. With hydrogen as a substituent for fluorine in fluorinated compounds, the F/H ratio per carbon compound should be no lower than 2.0. For mixed substituents such as H and Cl or H and Br on the carbon atom with F, the ratio of F/Cl+H should be 2.0 and above; and for F/Br+H, no lower than 3.0. Briefly then summarizing the foregoing, the minimum ratio of fluorine to Cl, B or H in a carbon compound should be F/Cl=1.0; F/H=2.0, F/Br=3.0 and for mixtures F/Cl+H=2.0, F/Br+H=3.0. In general, it is preferred that the total number of fluorine atoms in the carbon compound at least equal, but preferably exceed the total number of the other substituents in any carbon compound. Obviously, fully fluorinated carbon compounds are the best non-solvents for elastomeric compounds and these are specifically preferred.

Exemplary of the acyclic fluorocarbons applicable to the process herein and isomers thereof are: $CF_4$, $CHF_3$, $CH_2F_2$, $C_2Cl_2F_4$, $C_2F_6$, $C_2HClF_4$, $C_2HF_5$, $C_3Cl_3F_5$ $C_3Cl_4F_4$, $C_3F_8$, $C_3HBrF_6$, $C_3HClF_6$, $C_3HF_7$, $C_3H_2F_6$ $C_4ClF_9$, $C_4Cl_4F_6$, $C_4F_{10}$, $C_4HClF_8$, $C_4HF_9$, $C_4H_2ClF_7$ $C_4H_2F_8$, $C_5ClF_{11}$, $C_5Cl_3F_9$, $C_5F_{12}$, $C_5HClF_{10}$, $C_5HF_{11}$ $C_5H_2F_{10}$, $C_6Cl_2F_{12}$, $C_6Cl_3F_{11}$, $C_6Cl_6F_8$, $C_6F_{14}$, $C_6HClF_{12}$, $C_6HF_{13}$, $C_6H_2ClF_{11}$, $C_6ClF_{13}$, $C_7F_{16}$, $C_7HClF_{14}$, $C_7HF_{15}$, $C_8ClF_{17}$, $C_8Cl_6F_{12}$, $C_8F_{18}$, $C_8HClF_{16}$, $C_8HF_{17}$, $C_9ClF_{19}$, $C_9F_{20}$, $C_9HClF_{18}$, $C_9HF_{19}$, $C_{10}ClF_{21}$, $C_{10}Cl_6F_{16}$, $C_{10}Cl_7F_{15}$, $C_{10}Cl_8F_{14}$, $C_{10}Cl_{10}F_{12}$, $C_{10}HClF_{20}$, $C_{10}HF_{21}$, $C_{11}F_{24}$ $C_{11}HClF_{22}$, $C_{12}ClF_{25}$, $C_{12}Cl_8F_{18}$, $C_{12}HClF_{24}$, $C_{13}F_{28}$ $C_{13}HClF_{26}$, $C_{13}HF_{27}$, $C_{14}Cl_9F_{21}$, $C_{14}HClF_{28}$, $C_{14}H_{10}F_{20}$ $C_{16}Cl_{10}F_{24}$, $C_{16}F_{34}$ and up to $C_{18}$ carbon atoms. Although the boiling points of the foregoing acylic fluorocarbons range from −128° C. to around 200° C., it should be understood that the preferred fluorocarbons for commercially available processes should have a boiling point of about −0° C. to about 100° C., so that the process advantages realized by this invention are not minimized due to the requirement for very high pressure equipment or high processing temperatures, etc.

Exemplary of alicyclic fluorocarbons and isomers thereof which are applicable to the process herein include:

$\overline{CF_2CF_2CF_2}$, $\overline{CF_2CF_2CF_2CFCl}$, $\overline{CF_2CFClCF_2CFCl}$ $\overline{CF_2CF_2CF_2CF_2}$, $\overline{CHFCF_2CF_2CFBr}$, $\overline{CF_2CF_2CHFCHF}$ $\overline{CF_2CF_2CF_2CF_2CF_2}$, $\overline{CFCl(CF_2)_4CF_2}$, $\overline{CFCl(CF_2)_4CFCl}$ $\overline{CF_2(CFCL)_4CF_2}$, $\overline{CF_2(CF_2)_4CF_2}$, $\overline{CFH(CF_2)_4CF_2}$ $\overline{CFH(CF_2)_4CFH}$, $\overline{CFCl(CF_2)_4CFCF_3}$, $\overline{CFClCFCl(CF_2)_3CFCF_3}$

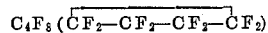, $\overline{CF_2(CF_2)_4CFCF_3}$, $\overline{CF_2(CF_2)_3CFC_2F_5}$ $\overline{CF_2(CF_2)_3C(CF_3)_2}$, $\overline{CFH(CF_2)_4CFCF_3}$, $\overline{CF_2CF_2CH_2CCH_2CF_2CF_2}$, $\overline{CH_2(CF_2)_2CH_2CF_2CFCF_3}$

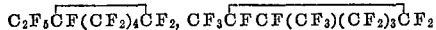
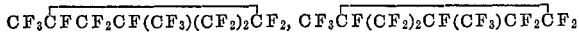
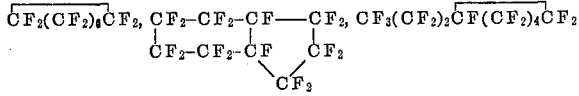

and higher, such as $C_{10}F_{18}$, $C_{10}F_{20}$, $C_{11}F_{20}$, $C_{11}F_{22}$, $C_{12}F_{20}$, $C_{12}F_{22}$ and up to $C_{18}$ to $C_{20}$ alicyclic fluorocarbons comprising a variety of cyclic rings in the molecule. The higher molecular weight fluorocarbon materials are liquid while the lower molecular weight ones are gaseous fluids. The alicyclic fluorocarbon $C_4F_8$, octafluorocyclobutane is an excellent polymerization medium for various ethylenically unsaturated monomers (see examples below). Although, in general, acyclic fluorocarbons containing unsaturation are not particularly preferred, there are some such fluorocarbons which are inert enough to the catalyst and reaction conditions and which can be used. Examples of these are the fluorinated compounds such as $CF_3$—$CF$=$CFCH_3$ and $(CF_3)_2C$=$CHCF_3$. Examples of aromatic fluorinated hydrocarbons which may be used include $C_6F_5CF_3$, $C_6F_5CH_3$, $C_6F_5CF_2CF_3$, p-$C_6F_4(CF_3)_2$, etc.

While cyclic and acylic fluorinated hydrocarbons which have H, Br or Cl as substitutents in minor amounts in the carbon atom have been indicated above as useful, a large number of other fluorocarbons such as the ethers, amines and thio compounds are likewise specifically applicable to the process of this invention. Of the applicable ethers there can be mentioned: $C_2F_5OC_2F_5$, $$CF_3OCF_2CF_2OCF_3, \; CF_3(CF_2)_3OCF_3$$

$CF_3(CF_2)_2O(CF_2)_2CF_3$ and including cyclic ethers as well. The amino fluorocarbons include such as $(CF_3)_3N$, $(CF_3)_2NC_2F_5$, $(C_2F_5)_3N$ (the amino should preferably be a tertiary amino group), while the thiofluorocarbons include $$CF_3SF_5CF_2(SF_3)_2, \; CF_2(SF_5)_2, \; (CF_3)S, \; (C_2F_5)_2SF_4$$

$(C_3F_7)_2S$, etc. As a matter of fact, other substitutents can also be present (such as silicon) so long as the molecule is rich in fluoride groups to the extent that the substitution of fluorine for hydrogen in the molecule causes the loss of their reactivity. Thus, with the amino fluorinated compounds, the amine group loses substantially its basicity and consequently its reactivity by substitution of fluorine for hydrogen atoms in the molecule (Encyclopedia of Chemical Technology, Interscience, vol. 6, p. 762–763 (1951)).

The invention is of general scope and encompasses the polymerization of ethylenically unsaturated monomers for the preparation of homopolymers such as ethylene, propylene and 1-olefins containing up to 10 carbon atoms or more, as well as branched chain olefins such as 4-methylpentene-1, 3-methylbutene-1, 5-methylheptene-1 and copolymers. In processes for the polymerization of alpha-olefins, the unique advantage provided by the polymerization media of this invention is the ability to recover a substantially dry polymer in finely divided form by a simple flashing operation, particularly when the normally gaseous or very volatile fluorocarbons are used in the process. Moreover, for alpha-olefin polymers such as those from butene-1 and higher, the advantages are even greater since heretofore it was customary to form these polymers in solution and this entailed certain problems in recovery and deashing of the polymers. Thus, one of the problems was in catalyst removal and processing the polymer without forming large lumps by coagulation from the solvent or fouling reactor surfaces. With the diluents of this invention the particles of substantially dry polymer, recovered after flashing or filtering the diluent, can be readily deashed with alcohols without coagulation. The process of this invention thus eliminates substantially the prior art problems associated with these polymerizations, since the polymers can be recovered in discrete particle form without being swollen and/or sticking to reactor walls. Moreover, due to the volatile nature of some of the preferred fluorinated carbon containing organic compounds herein, the poly-alpha-olefins can be recovered substantially dry by a simple flashing operation. The process of this invention is obviously applicable to random copolymers of alpha-olefins where the polymer produced still contains some crystallinity, for example, ethylene-propylene copolymers containing above 75% propylene or ethylene.

Where normally gaseous ethylenically unsaturated monomers are polymerized using the organic fluorinated carbon compounds of this invention as diluents, it may become necessary to use pressures of, for example, 50 to 1000 p.s.i.g. or higher if desired to cause the reaction to go with efficiency. Thus, depending on the diluent and the gaseous monomer, the solubility of the latter may be so slight in the former that pressure may be required to obtain a proper concentration of monomer for reaction purposes. This is illustrated in one aspect of this invention in Example 6 below where an ethylene-propylene mixture was introduced at atmospheric pressure to contact a catalyst in a diluent of this invention. Since in this example no visible copolymer was formed, a liquid monomer was then introduced to determine if the catalyst was active. The liquid monomer readily formed polymer indicating that the catalyst was active and further indicating that a pressure higher than atmospheric was required to polymerize the ethylene-propylene mixture in this system.

In addition to the elastomeric ethylene-propylene (and terpolymers) rubbers, the invention is equally applicable to the preparation of stereospecific styrene-butadiene rubbers, that is, those linear rubbers formed by block copolymerization of styrene and butadiene (or isoprene) with lithium catalysts.

Although as indicated, the organic fluorinated carbon compounds of this invention are applicable as diluents in the preparation of block copolymers of alpha-olefins, for example, polypropylene followed by random ethylene-propylene blocks and the like, the diluents are also adaptable to the preparation of intimate mixtures or blends of resins and rubbers. By this, it is understood that a hydrocarbon polymer, such as polypropylene or polyethylene can be prepared in one vessel and to that polymer there is added thereafter a fluorinated carbon compound, followed by the addition of catalysts and elastomer forming ethylenically unsaturated compounds. Polymerizations according to this technique result in intimate blends of resin-rubber mixtures useful for a variety of purposes.

As might be noted from the foregoing description of the applicability of the process of this invention to polymerization reactions involving ethylenically unsaturated monomers, the process is specifically applicable to those polymerizations employing initiating quantities of Ziegler, Natta-Ziegler or coordination type catalysts or any of the stereospecific catalysts known in the art which are useful for the preparation of resins and elastomers.

While the invention is specifically applicable to the foregoing type of polymerization catalysts, it is not so limited since initiating quanties of free-radical type catalysts can also be used for polymerization reactions in the organic fluorinated carbon compounds of this invention. It is a feature of the organic fluorinated carbon compounds herein that they are inert, or substantially so, toward the various catalysts herein noted and consequently can be used for the various processes indicated. Thus, ordinary emulsion polymerized monomers, specifically those of an elastomeric forming type, can be carried out in the organic fluorinated carbon compounds herein using free-radical catalysis. Examples of such emulsion polymerized rubbers are SBR's, chloroprene, nitrile rubbers, and polymers and copolymers of a variety of elastomer forming materials.

Since the process of this invention is directed to a slurry polymerization of ethylenically unsaturated monomers, the physical nature of the organic fluorinated carbon compound used as polymerization media is important and will be discussed with reference to the various types of polymers for which such media can be used. In general, the lower molecular weight acyclic and alicyclic fluorinated carbon compounds (example: $C_1$ to $C_4$) are gases at ambient temperatures, the exception being in some cases those compounds containing bromine or chlorine as substituents for some of the fluorine atoms. As molecular weight increases for example from $C_5$ and above, the fluorocarbons are ordinarily liquid at normal or ambient conditions of temperature and pressure. The higher molecular weight fluorocarbons, for example, those boiling above about 150° C., can be used as polymerization media, and these are preferably separated from the polymer slurries formed by filtration, for example. The normally gaseous ones or those boiling below 100° C. possess additional advantages when used in this process as polymerization media in that they can be separated from discrete particles or crumbs of elastomeric or solid polymeric particles by a simple flashing operation to obtain a substantially dry processable polymer. This, of course, is not readily possible where the diluent media of the prior art dissolves or swells or partially dissolves the polymer formed in the process.

In any polymerization reaction involving ethylenically unsaturated monomers, the temperatures, pressures and organic fluorocarbon compounds used should be selected so that the critical temperature of the fluorocarbon used is not exceeded. A review of critical temperatures of several low molecular weight fluorocarbons indicates that in substantially all cases critical temperatures lie within a region where most polymerization reactions can be readily carried out (above about 24° C.). In one instance, that is, with $CF_4$, the critical temperature reported was about −46° C., but even at this temperature, the fluorocarbon can readily be used for isobutylene-isoprene copolymerizations which are normally carried out at temperatures much lower than this. It should be understood also that in many instances various mixtures of fluorocarbon compounds can be employed in polymerization reactions.

With the foregoing in mind, one of the amorphous copolymers to which this invention is applicable is the ethylene-propylene type of elastomer. Ethylene-propylene copolymer rubber is a saturated amorphous material prepared with Ziegler catalysts and contains from about 35 to 67 mole percent ethylene. A typical polymerization is a solution of polymerization where small amounts of the mixed olefins are fed to a vessel containing a hydrocarbon such as isooctane and catalysts such as trihexyl aluminum and vanadium oxytrichloride or catalysts such as those disclosed in U.S. Patent 3,000,867 which typically illustrate that concentration of the copolymer formed is in the order of 3 to 5% by weight (agitation becomes difficult for higher conversions) when a diluent such as tetrachloroethylene is employed. Other amorphous rubbery copolymers include those of ethylene with butene-1 and alpha-olefins containing up to 12 carbon atoms (see British 925,468 for disclosure of copolymerizable monomers applicable herein). Further, copolymer elastomers of at least two terminally unsaturated straight chain monoolefins each containing from 3 to 12 carbon atoms such as propylene:butene-1, propylene:hexene-1, butene-1:hexane-1, butene-1:dodecene-1, pentene-1:hexene-1, etc. all as disclosed in U.S. Patent 3,093,624 can also be prepared. In this patent, benzene is disclosed as the solvent and the typical problem of the prior art in encountering viscous polymerization masses which require low conversions and various steps for recovery of these from reaction vessels is illustrated. Catalysts such as lithium aluminum alkyl with $TiCl_4$ are disclosed in this patent and reaction temperatures of 50° to 100° C. at ordinary pressures. Excellent fluorocarbons which could be used for the foregoing amorphous copolymers would be octafluoropropane, decafluorobutane, octafluorocyclobutane, trichloropentafluoropropane, etc. according to the process of this invention.

The alpha-olefin terpolymer rubbers (i.e. vulcanizable) illustrated in U.S. Patents 2,933,480, 3,000,866, 3,063,973 (e.g. ethylene/propylene/alkyl norbornadiene) 3,093,621, 3,093,620; British patent 880,904 and Canadian 754,925, etc. disclosing a variety of catalysts, can likewise be employed in this process. In general, the terpolymers of the foregoing include the copolymerization of alpha-olefins such as ethylene and propylene with minor amounts of a non-conjugated diene (in the case of dicyclopentadiene from 1 to 3 percent, for example).

For the polymerization of the so-called "stereo" rubbers such as cis-1,4 polyisoprene, cis-1,4 polybutadiene, trans-1,4 polyisoprene and others, a variety of Ziegler type catalysts as well as lithium metal or alkyls, cobalt compounds and vanadium catalysts have been disclosed heretofore. For the polymerization of butadiene to a high cis-1,4 content, it is preferred to use either the lithium alkyl catalyst (butyl lithium) or a cobalt chloride-aluminum alkyl halide catalyst system. In the prior art a diluent such as hexane was employed at low polymerization temperatures of about 5° to 20° C. As is the usual case with these prior art systems, while the proportion of solvent used is not critical, it is used in amounts such that the viscosity of the reactor contents is low enough to permit mixing and adequate temperature control. The preferred conjugated dienes usually disclosed in the prior art are those containing from 4 to 8 carbon atoms such as butadiene, isoprene, dimethyl butadiene, piperylene, methyl pentadiene, etc. Conversions of butadiene (see for example, U.S. 3,111,510 disclosing a cobalt catalyst with an aluminum alkyl) are ordinarily 10 percent or less at the temperatures indicated above. For isoprene polymerizations, vanadium catalysts are preferred for the preparation of the trans-1,4 polyisoprene (Belgian 545,952). It should be understood that butadiene or isoprene can be prepared in any stereospecific form known heretofore by employment of catalysts heretofore disclosed, but using the fluorinated carbon compounds of this invention as the polymerization media in order to obtain the advantages herein disclosed.

As for stereospecific SBR's, the processes disclosed in British Patents 844,490 and 895,980 for preparing binary and block copolymers of styrene-butadiene or isoprene with lithium alkyl catalysts can likewise be adapted to the fluorinated carbon compound diluents of this invention.

While it is apparent from the foregoing that the fluorocarbon compounds of this invention can be used as polymerization media with stereospecific catalysts such as Ziegler type or Natta-Ziegler type catalysts, as well as modifications including lithium metals or alkyls or cobalt compounds, the fluorocarbons can also be used with a variety of other catalysts. The fluorocarbons of this invention can be used with free-radical initiating type catalysts which have heretofore been used for polymerizing such as styrene, styrene-butadiene, butadiene-acrylonitrile in aqueous emulsion. The fluorocarbons are not known to be reactive with the peroxides and consequently can be used effectively as substitutes for aqueous systems in polymerizations of this type.

The fluorocarbons tested for elastomer swelling or used in the examples below are not reactive with the catalysts mentioned and consequently can be used where inert hydrocarbons have heretofore been used in polymerization processes.

As indicated heretofore, it is preferred to use fluorocarbons which have a boiling point of from about −40° C. to about 100° C. since this is the span of temperature ranges most useful in commercial polymerizations of the various ethylenically unsaturated monomers to form polymers, copolymers, block copolymers, interpolymers, etc.

Excellent fluorocarbons for use in such polymerization reactions are those which can be liquefied under moderate pressures or are low boiling liquids. Thus, dichlorotetrafluoroethane (B.P. 3.6° C.), chloropentafluoroethane (B.P. −83.7° C.), octafluoropropane (B.P. 38° C.), octafluorocyclobutane (B.P. −6.0° C.), decafluorobutane (B.P. −1.7° C.), octafluorobutene-2 (B.P. 1.2° C.), trichloropentafluoropropane (B.P. 72° C.), perfluorotriethyl amine (B.P. 71° C.), perfluoroethyl ether (B.P. 10° C.), perfluorobutyl ether (B.P. 102° C.) and the like can be used. The cyclic fluorocarbon, octafluorocyclobutane, was one of the ones selected for various polymerizations illustrative of those encompassed herein. An example is also shown below illustrating a prior art chlorinated diluent which is outside the scope of this invention and a typical prior art butene-1 polymerization reaction.

The following examples illustrate the invention without limiting it. The polymerizations were performed, unless otherwise indicated, in a 1.6 liter stainless steel autoclave with titanium trichloride ($3TiCl_3 \cdot AlCl_3$) and diethylaluminum monochloride. Inherent viscosities were measured as 0.06 to 0.08% (by weight) solutions in decalin at 135° C.

EXAMPLE 1

Preparation of polybutene-1

Octafluorocyclobutane was purified by stirring at 60° C. for one hour with a mixture of diisobutylaluminum hydride and titanium trichloride in mineral oil. The fluorocarbon was distilled into a stainless steel pressure cylinder.

The reactor was charged, while under an argon atmosphere, with a mixture of 0.14 gram of titanium trichloride and 0.40 gram of diethylaluminum monochloride in 10 ml. of n-pentane. To this was added 0.027 gram of hydrogen and 1080 ml. of a 30% (by volume) solution of butene-1 in liquid octafluorocyclobutane. The reaction mixture was stirred at 65° C. for 2.0 hours under autogenous pressures (152 p.s.i.g.) and the solvent then distilled at 45° C. into a storage cylinder. The product was a dry fluffy powder which did not stick to the reactor walls. The polymer was deashed with an isopropanol-heptane mixture (3:1 by volume). The dried polymer weighed 50 grams and had an inherent viscosity of 3.2 and was 7.0% soluble in boiling diethyl ether (Rate=175 grams polymer/gram $TiCl_3$/hour; M.P.=123° to 125° C.).

EXAMPLE 2

Preparation of polybutene-1

This example demonstrates the polymerization of butene-1 in solution in n-heptane—a commonly used hydrocarbon polymerization vehicle.

A two liter glass polymerization flask was charged, while under a nitrogen atmosphere, with 2.0 grams of titanium trichloride, 5.1 grams of diethylaluminum chloride, and 1.0 liter of anhydrous n-heptane. The temperature was raised to 60° C. and gaseous butene-1 (at 1 atmosphere pressure) was introduced into the bottom of the stirred vessel at a rate of 1.3 liters per minute. The rate of butene-1 consumption decreased with time and so after 50 minutes the monomer feed was reduced to 1.0 liters per minute. After a total reaction time of 2.0 hours, the solution became too viscous to stir. The viscous gelatinuous solution was coagulated by pouring it into cold isopropanol with rapid stirring. The polymer was collected and washed with isopropanol in a Waring Blendor. The dried polymer weighed 98 grams (Rate=25 grams polymer/gram of $TiCl_3$/hour; final polymer concentration was 13 weight percent) and had an inherent viscosity of 3.3 and a M.P. of 123° to 125° C.

EXAMPLE 3

Preparation of ethylene-butene-1 copolymer

The reactor was charged, while under an argon atmosphere, with a mixture of 0.30 grams of titanium trichloride and 0.68 grams of diethylaluminum monochloride in 9 ml. of n-pentane. To this was added 1100 ml. of a 20% (by volume) solution of butene-1 in liquid octafluorocyclobutane. Ethylene gas was then metered into the reactor at a constant rate of 0.13 grams/minute. The stirred mixture was rapidly heated to 55° C. and maintained at this temperature (the reactor pressure remained constant at about 140 p.s.i.g.) for 2.0 hours. The solvent was then distilled at 40° C. into a storage cylinder. The product was obtained as dry rubbery beads and and crumbs that did not stick to the reactor walls (this proves that the copolymer formed in the reaction was insoluble in the solvent). The polymer was deashed by slurrying it in boiling benzene and adding the mixture to cold isopranol in a Waring Blendor. The product weighed 34 grams, had an inherent viscosity of 8.2, was 39% soluble in boiling benzene, and contained 48% (by weight) of ethylene.

EXAMPLE 4

Preparation of a polypropylene-butene-1 block copolymer

The reactor was charged while under a propylene atmosphere with a mixture of 0.13 grams of titanium trichloride and 0.30 grams of diethylaluminum monochloride in 10 ml. of n-pentane. To this was added 0.35 grams of hydrogen and 900 ml. of liquid propylene. The mixture was stirred at 65° C. for 2.0 hours and unreacted propylene vented. The residual propylene was replaced with argon and 0.35 grams of diethylaluminum monochloride in 10 ml. of pentane added. To this was then added 1080 ml. of a 30% (by volume) solution of butene-1 in liquid octafluorocyclobutane. The mixture was stirred at 55° C. under autogenous pressure (about 115 p.s.i.g.) for 2.0 hours and the solvent distilled (at 40° C.) into a storage cylinder. The crude product was a dry powder. The polymer was deashed with an isopropanol-heptane mixture (3:1 by volume). The product weighed 140 grams, had an inherent viscosity of 2.8, and contained approximately 15% (by weight) of polymerized butene-1 units.

EXAMPLE 5

Polymerization of butene-1 in methylene chloride

This example illustrates the use of a prior art diluent in the preparation of polybutene. The reactor was charged, while under an argon atmosphere, with 800 ml. of anhydrous methylene chloride. The solvent was degassed by pressuring the autoclave fifteen times with argon to 50 p.s.i.g., each time releasing the pressure to 1 p.s.i.g. To the reactor was then added 1.13 grams of diethylaluminum monochloride in 5 ml. of n-pentane and the mixture stirred for 15 minutes. A mixture of 1.00 grams of titanium trichloride and 1.13 grams of diethylaluminum monochloride in 10 ml. of n-pentane was next added and the mixture heated to 65° C. After 15 minutes at 65° C., 100 ml. of liquid butene-1 was added and the contents stirred at 65° C. for 1.0 hour under autogenous pressure. After the reactor had cooled, a small amount of solid was found floating on the solvent. One hundred milliliters of methanol was added and the mixture heated to a boil. The solid dissolved. The solution was concentrated to one-fourth the original volume and treated with 1 liter of methanol. An oily liquid separated. The oil was extracted with cold isopropanol and 5 grams of waxy solid recovered. The solid had a melting point range of 80° to 85° C. and was soluble in cold hexane. The isopropanol-soluble material was coagulated with methanol and 14 grams of an oily liquid obtained. It should be noted from the foregoing that no high molecular weight polymer was formed under the reaction conditions illustrated in this example (isotactic polybutene-1 ordinarily has a crystalline M.P. of about 126° to 130° C.).

EXAMPLE 6

Polymerization of 4-methylpentene-1

A one liter glass polymerization flask was charged, while under a nitrogen atmosphere, with 0.50 gram of titanium trichloride, 0.64 gram of diethylaluminum chloride and 500 ml. of anhydrous trichloropentafluoropropane. The mixture was stirred at 60° C. for 15 minutes and 0.44 gram of tetrabutyltitanate added. An attempt to polymerize an ethylene-propylene mixture in this vessel at atmospheric pressure did not indicate visually that any polymer was formed. To determine whether the catalyst was active, 18 grams of 4-methylpentene-1, a liquid, was added. The temperature rose immediately from 50° to 55° C. Two grams of 4-methylpentene-1 polymer was isolated after a two hour reaction period. The polymer formed at a rate comparable to that in heptane, but in this case, as hard small polymer particles, rather than the large swollen particles usually formed in heptane.

EXAMPLE 7

Treatment of ethylene-propylene rubber with octafluorocyclobutane

A ten gram sample of a commercial ethylene-propylene rubber and 500 ml. of liquid octafluorocyclobutane were mixed in a two liter glass autoclave. The contents were slowly heated to 60° C. and maintained at this temperature for two hours. There was no visible change in the rubber. The solvent was redistilled into the storage cylinder. There was no noticeable difference between the recovered rubber and the untreated rubber. In contrast, methylene chloride at 25° C. attacked the ethylene-propylene rubber after being kept in contact with it for a few minutes. The polymer was pronouncedly swollen at this temperature.

In the table below are further runs illustrating the polymerization of butene-1 at various temperatures and concentration in 1 to 1.8 liters of diluent at autogenous pressures.

discrete particle form which comprises employing as a polymerization medium a fluorinated organic carbon compound wherein the ratios of fluorine to other substituents on the carbon compound are in the order of F/Cl=1.0 and above, F/Br=3.0 and above, F/H=2.0 and above, F/(Cl+H)=2.0 and above and F/(Br+H)=3.0 and above, said amorphous copolymer being substantially insoluble and not swellable in said polymerization medium.

2. In a process for preparing an alpha-olefin terpolymer rubber in a slurry by copolymerizing two alpha-olefins in the presence of minor amounts of a third monomer containing at least two non-conjugated double bonds in a reaction zone, said polymerization being carried out in the presence of a catalyst, the improvement for substantially eliminating reaction zone fouling and recovering the terpolymer is discrete particle form which comprises employing as a polymerization medium a fluorinated organic carbon compound wherein the ratios of fluorine to other substituents on the carbon compound are in the order of F/Cl=1.0 and above, F/Br=3.0 and above, F/H=2.0 and above, F/(Cl+H)=2.0 and above and F/(Br+H)=3.0 and above, said terpolymer rubber being substantially insoluble and not swellable in said polymerization medium.

3. In a process for preparing a rubbery polybutadiene in a slurry by polymerizing butadiene in the presence of a catalyst in a reactor zone, the improvement for substantially eliminating reaction zone fouling and recovering the polybutadiene in discrete particle form which comprises employing as a polymerization medium a fluorinated organic carbon compound wherein the ratios of fluorine to other substituents on the carbon compound are in the order of F/Cl=1.0 and above, F/Br=3.0 and above,

F/H=2.0 and above, F/(Cl+H)=2.0 and above and

F/(Br+H)=3.0 and above, said rubbery polybutadiene being substantially insoluble and not swellable in said polymerization medium.

TABLE.—POLYMERIZATION OF BUTENE-1 IN OCTAFLUOROCYCLOBUTANE [1]

| Run No. | Grams of $H_2$ added | TiCl₃, grams | Monomer conc.[2] | React. temp. (° C.) | React.[3] time (hrs.) | Reaction pressure (p.s.i.g.) | Rate, grams/gram, TiCl³/hr. | IV | MI [4] | Solubility [5] |
|---|---|---|---|---|---|---|---|---|---|---|
| 1 | 0.011 | 0.99 | 30 | 35 | 2 |  | 21 | 2.67 | 0.50 | 0.53 |
| 2 | 0.011 | 0.49 | 30 | 45 | 2 |  | 58 | 3.67 | 0.14 |  |
| 3 | 0.0088 | 0.25 | 30 | 55 | 1.6 | 128 | 96 | 3.44 | 0.12 |  |
| 4 | 0.027 | 0.14 | 30 | 65 | 2 | 152 | 175 | 3.19 | 0.39 | 7.0 |
| 5 | 0.044 | 0.16 | 50 | 55 | 2 | 130 | 108 | 1.78 | 3.10 |  |
| 6 | 0.018 | 0.14 | 15 | 75 | 2 | 185 | 69 | 1.43 |  |  |

[1] Using the catalyst system diethylaluminum monochloride-TiCl³ (Al/Ti=4).
[2] Approximate initial monomer concentration (vol. percent).
[3] Reaction time is approximate, in that it does not include the distillation time for solvent recovery.
[4] ASTM-1238; 190° C. and a 2,160-gram load.
[5] Solubility in diethyl ether (percent).

In all of the foregoing runs, after the reactor was vented, the polymer was obtained as a dry powder which was easily deashed with an isopropanol-heptane mixture. It should be noted from the foregoing runs that higher polymerization temperatures result in increased rates of polymerization, thereby allowing shorter residence times for a given catalyst productivity.

The foregoing examples illustrate the broad concept of this invention. Various modifications can be made to the process herein without departing from the teachings or the scope of the appended claims.

What is claimed is:

1. In a process for preparing a saturated amorphous copolymer of two alpha-olefins in a slurry, each of said alpha-olefins containing up to 12 carbon atoms by polymerizing said alpha-olefins in the presence of a catalyst in a reaction zone, the improvement for substantially eliminating reaction zone fouling and recovering the copolymer in 4. In a process for preparing a rubbery polyisoprene in a slurry by polymerizing isoprene in the presence of a catalyst in a reaction zone, the improvement for substantially eliminating reactor zone fouling and recovering the polyisoprene in discrete particle form which comprises employing as a polymerization medium a fluorinated organic carbon compound wherein the ratios of fluorine to other substituents on the carbon compound are in the order of F/Cl=1.0 and above, F/Br=3.0 and above, F/H=2.0 and above, F/(Cl+H)=2.0 and above and F/(Br+H)=3.0 and above, said rubbery polyisoprene being substantially insoluble and not swellable in said polymerization medium.

5. In a process for preparing a rubbery styrene-butadiene copolymer in a slurry by polymerizing styrene and butadiene in the presence of a catalyst in a reaction zone, the improvement for substantially eliminating reaction zone fouling and recovering the copolymer in discrete particle form which comprises employing as a polymerization medium a fluorinated organic carbon compound wherein the ratios of fluorine to other substituents on the carbon compound are in the order of F/Cl=1.0 and above, F/Br=3.0 and above, F/H=2.0 and above, F/(Cl+H)=2.0 and above and F/(Br+H)=3.0 and above, said rubbery styrene-butadiene copolymer being substantially insoluble and not swellable in said polymerization medium.

6. In a process for preparing a rubbery butadiene-acrylonitrile copolymer in a slurry by polymerizing butadiene and acrylonitrile in the presence of a catalyst in a reaction zone, the improvement for substantially eliminating reaction zone fouling and recovering the copolymer in discrete particle form which comprises employing as a polymerization medium a fluorinated organic carbon compound wherein the ratios of fluorine to other substituents on the carbon compound are in the order of F/Cl=1.0 and above, F/Br=3.0 and above, F/H=2.0 and above, $$F/(Cl+H)=2.0$$

and above and F/(Br+H)=3.0 and above, said rubbery butadiene-acrylonitrile copolymer being substantially insoluble and not swellable in said polymerization medium.

7. The process of claim 1 wherein the alpha-olefins are ethylene and propylene and the fluorinated organic carbon compound is octafluorocyclobutane.

8. The process of claim 2 wherein the fluorinated organic carbon compound is octafluorocyclobutane.

UNITED STATES PATENTS
References Cited

| | | | |
|---|---|---|---|
| 3,162,620 | 12/1964 | Gladding | 260—80.5 |
| 3,150,122 | 9/1964 | Anderson et al. | 260—94.3 |

FOREIGN PATENTS

| | | |
|---|---|---|
| 781,532 | 8/1957 | Great Britain. |
| 849,112 | 9/1960 | Great Britain. |

OTHER REFERENCES

Hildebrand and Scott, "Solubility of Nonelectrolytes," 3rd edition, pp. 367–376 relied upon, Reinbold Co., N.Y., 1950.

JOSEPH L. SCHOFER, Primary Examiner

ROGER S. BENJAMIN, Assistant Examiner

U.S. Cl. X.R.

260—84.1, 88.2, 94.3

PO-1050
(5/69)

UNITED STATES PATENT OFFICE
CERTIFICATE OF CORRECTION

Patent No. 3,470,143      Dated September 30, 1969

Inventor(s) Albert Schrage and Jules E. Schoenberg

It is certified that error appears in the above-identified patent and that said Letters Patent are hereby corrected as shown below:

Claim 4, column 12, line 68 should read as follows:

and above, $F/(Cl+H)=2.0$ and above and $F/(Br+H)=3.0$

SIGNED AND
SEALED
JAN 6 - 1970

(SEAL)
Attest:

Edward M. Fletcher, Jr.
Attesting Officer

WILLIAM E. SCHUYLER, JR.
Commissioner of Patents